US007273576B2

(12) United States Patent
White

(10) Patent No.: US 7,273,576 B2
(45) Date of Patent: Sep. 25, 2007

(54) HULL AND FUSELAGE CONSTRUCTION

(76) Inventor: Allan White, 423 Calvert Ave., Alexandria, VA (US) 22301

( * ) Notice: Subject to any disclaimer, the term of this patent is extended or adjusted under 35 U.S.C. 154(b) by 379 days.

(21) Appl. No.: 10/976,003

(22) Filed: Oct. 29, 2004

(65) Prior Publication Data
US 2005/0145161 A1    Jul. 7, 2005

Related U.S. Application Data

(60) Provisional application No. 60/375,716, filed on Apr. 29, 2002.

(51) Int. Cl.
B29C 45/16 (2006.01)
B63B 5/04 (2006.01)

(52) U.S. Cl. .................. 264/257; 264/261; 264/263; 264/271.1; 114/358

(58) Field of Classification Search ............. None
See application file for complete search history.

(56) References Cited

U.S. PATENT DOCUMENTS

| 2,331,296 | A | * | 10/1943 | Bendix | ............. 156/382 |
| 2,370,429 | A | | 2/1945 | Vidal | |
| 2,426,729 | A | | 9/1947 | Davidson | |
| 3,040,344 | A | | 6/1962 | Theakston | |
| 4,132,755 | A | | 1/1979 | Johnson | |
| 4,543,284 | A | | 9/1985 | Baum | |
| 4,615,936 | A | | 10/1986 | Baum | |
| 4,689,257 | A | | 8/1987 | Baum | |
| 4,931,124 | A | | 6/1990 | Baum | |
| 5,096,651 | A | | 3/1992 | leComte | |
| 5,304,339 | A | | 4/1994 | leComte | |
| 5,526,767 | A | | 6/1996 | McGuiness et al. | |
| 6,021,732 | A | | 2/2000 | Hobbs | |

* cited by examiner

Primary Examiner—Richard Crispino
Assistant Examiner—Barbara J Musser
(74) Attorney, Agent, or Firm—Shoemaker and Mattare

(57) ABSTRACT

A boat hull or an aircraft or spacecraft fuselage is constructed by laying up perforated architectural wood veneer strips which have been designed to create the desired shape and overlap one another. A layer of strips is placed in or on a mold of the final desired shape, with each piece slightly overlapping the previous piece. The strips are bonded to one another using epoxy resin or other adhesives. The thickness of the wood strip at the overlap creates a chaseway of air along the length and ends of the each piece of adjoining wood veneer. The chaseways, in conjunction with perforations made in the wood veneer, permit the infusion of resin and removal of air without requiring any additional medium or device. The gap-filling capability of the epoxy and the thinness of the veneer give the final panel a smooth surface in spite of the veneer overlaps.

5 Claims, 4 Drawing Sheets

HULL AND FUSELAGE CONSTRUCTION

REFERENCE TO EARLIER APPLICATION

This Application is a continuation-in-part of International Application No. PCT/US0311495, filed Apr. 29, 2003, by A. H. White, entitled Boat Hull Construction, which claims priority from U.S. Application No. 60/375,716, filed Apr. 29, 2002.

BACKGROUND OF THE INVENTION

Traditional wooden boats are constructed by carefully assembling a wood frame and covering the framing with wood decking ("strakes"). Each strake is fabricated and installed by hand. Tight fitting joinery is necessary for structural, water tightness and cosmetic reasons. To achieve tight joinery, pieces need to be custom fit by highly skilled labor. Because of the cost of skilled labor and the amount of time necessary for the hand fitting of the components, wooden boats have been much more expensive to make than have composite boats.

Composite boats are constructed of multiple layers of a structural reinforcement fabric such as fiberglass, Kevlar or carbon fiber, a core material such as urethane or polystyrene foam for structural reinforcement and floatation, a resin/adhesive such as epoxy, vinyl ester or polyester. ("Kevlar" is DuPont's trademark for a polyamide fiber). The resin both binds the reinforcements together while acting as a filler for the weave of the fabric. Gunwales are added along the upper edges of the composite hull.

Contemporary composite canoes are manufactured in two basic ways: the "wet-out" method and the vacuum infusion method. The former method involves placing multiple layers of reinforcement into a female mold and then thoroughly wetting those layers with resin applied by hand. The results of this method result in a heavy boat due to the large amount of resin used. The "wet-out" technique is labor intensive and exposes the builders to health risks associated with working resins and their associated solvents.

With the second method—vacuum infusion—reinforcing elements are placed in a mold, then are covered with an infusion media, release fabric and airtight film, and finally are placed under a vacuum via a plastic tubing plumbing system. The air between the mold and film is extracted while the force of the vacuum draws in the resin. The resulting boat is lighter than a wet-out boat because the vacuum consolidates the reinforcements and draws out excess epoxy. In addition, the vacuum infusion method greatly reduces the builder's exposure to the epoxy and its solvents. A disadvantage of current infusion techniques is that they require the use of vacuum media (plastic mesh or core material) to allow the air/epoxy to flow across the fabric reinforcement and they also require substantial amounts of plastic tubing to create the air/epoxy distribution system. The infusion materials are consumed by the production of each boat, as they are either stripped from the finished hull and thrown away, or are left buried within the hull.

Canoes built using fiberglass are normally constructed using five or six layers of reinforcement and cored ribs layered with additional layers of fiberglass. The multiple layers and ribs are necessary to create an adequate structure. Gunwales and two or three thwarts (cross-members) are required as part of the basic structure. These layers are held together using approximately 3.5 to 4 gallons (7-8 liters) of resin. The final result is boat that typically weighs around sixty five to seventy five pounds (30-35 kg), has a fairly brittle hull, and requires additional means of floatation to prevent it from sinking when swamped.

Canoes built using carbon fiber or Kevlar normally have two or three layers of reinforcement and cored ribs layered with additional layers of carbon or Kevlar. Owing to the higher strength of carbon/Kevlar, these boats use fewer layers of reinforcement and therefore less resin to achieve the required minimum strength. This results in a finished boat that typically weighs 40 to 45 pounds (18-20 kg) or about 40% less than a fiberglass boat. However, the cost of carbon/Kevlar is approximately eight to ten times that of fiberglass, making boats of this type substantially more costly than those of fiberglass.

SUMMARY OF THE INVENTION

An object of the invention is to provide a method of economically mass producing wood boat hulls or similar products which have complex curved surfaces.

Another object is to provide composite complex panels having improved structural strength-to-weight ratios.

A further object is to provide a way of vacuum infusing finished products without having to add or use any additional materials solely for the purpose of allowing air to be evacuated and adhesive to be infused.

These and other objects are met by laying up, in a mold, perforated architectural wood veneer strips which have been designed to create the desired shape and partially overlap one another, so that they are not in edgewise abutment. The thickness of the wood strips at the overlaps creates channels or chaseways along the length and ends of the each piece of adjoining wood veneer. The chaseways, in conjunction with perforations made in the wood veneer, allow one to infuse resin and remove air without requiring any additional medium or device. The gap-filling capability of the epoxy and the thinness of the veneer give the final panel a smooth surface in spite of the veneer overlaps.

The invention lowers the cost of the finished product by eliminating labor and materials. It also is also environmentally sound because it greatly reduces the amount materials which are conventionally used once and then thrown away.

DESCRIPTION OF THE PREFERRED EMBODIMENT

Figure 1:
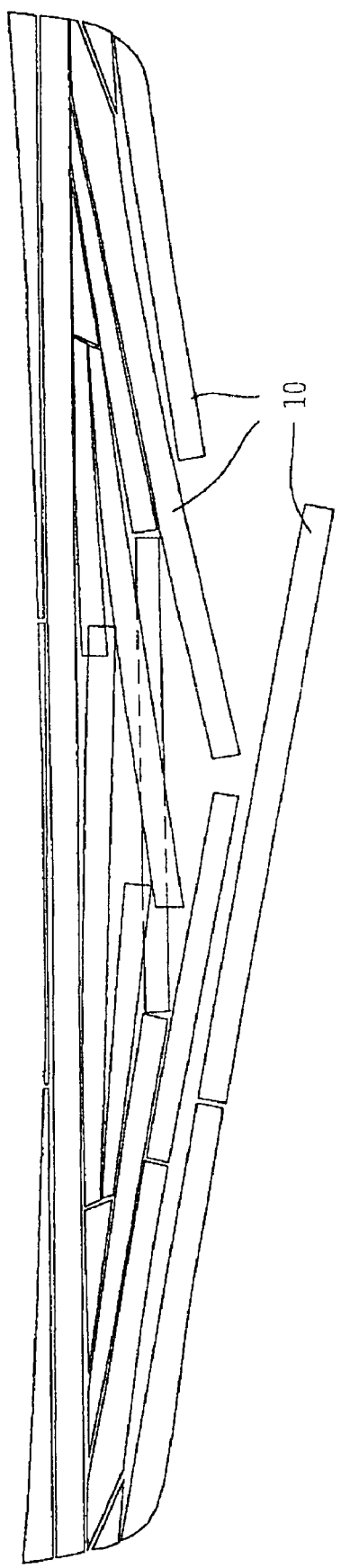
FIG. 1 is a side elevation of a canoe embodying the invention.

According to this invention, wood veneer strips or strakes 10 of any desired width are laid-up on a mold corresponding to the desired finished design. A design layout is composed by tracing the edge of the desired exposed piece, as shown in FIG. 1. A desired amount of overlap is selected and transferred to fabrication templates or is input into a computer numerical control ("CNC") database.

The veneer pieces may be mass produced either by pin router using master templates, or by CNC routers. Pieces are numbered by type and are then perforated with a rotating array of notched razor knives (not shown) on ¼" (6 mm) centers, run parallel to the grain. The resulting pieces have parallel broken lines of perforations. The perforations are fine enough not to be visible in the finished product, but perform two functions. First, the perforations enable the veneer to more readily conform to a complex shape, and, secondly, they greatly enhance evacuation of air and infusion of epoxy resin.

Preferably, fiberglass fabric 12 is first laid into the mold, and thereafter the horizontal wood strakes 10 are inserted. The strakes extend generally lengthwise of the hull, but are not necessarily parallel to one another. They preferably have about a half-inch (12.5 mm) lateral overlap. The strakes are aligned in the mold using a centerline that has been scribed into it and with one another, using alignment holes or notches, and are temporally held in place using small magnets in predetermined locations. The magnet locations are laid out to allow for the subsequent installation of an inner Kevlar layer 14 starting at the boat centerline. A two-foot (600 mm) wide piece of precut Kevlar is laid into the mold on top of the previously installed strakes. Then, transverse wooden ribs 16 are installed on top of the Kevlar. The first series of ribs is installed starting at the midpoint and working toward the bow and stern. The port side of each rib is aligned with the a clamp rib layout line and the rib is adjusted so that it lies smooth and aligns with the starboard rib layout line.

Figure 2:
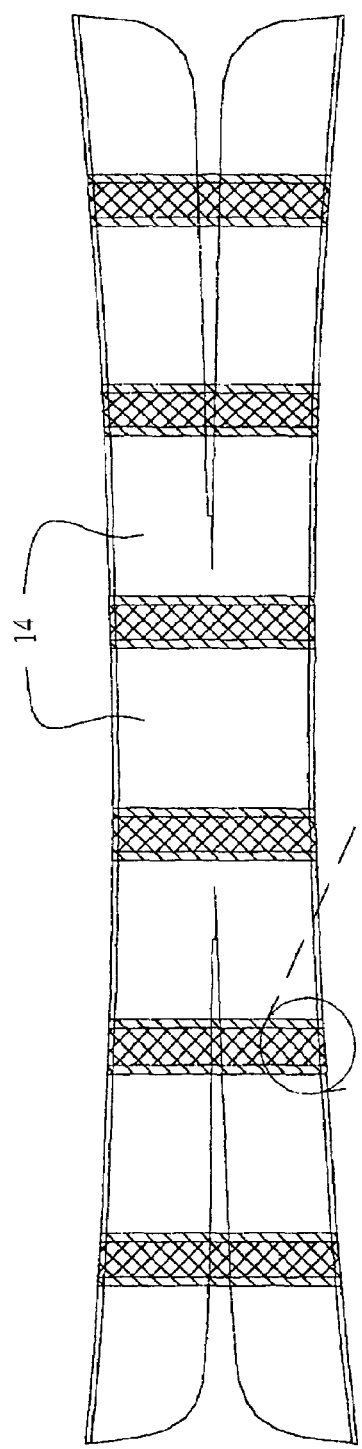
FIG. 2 is diagram showing the layout of hull reinforcing elements.
Figure 3:
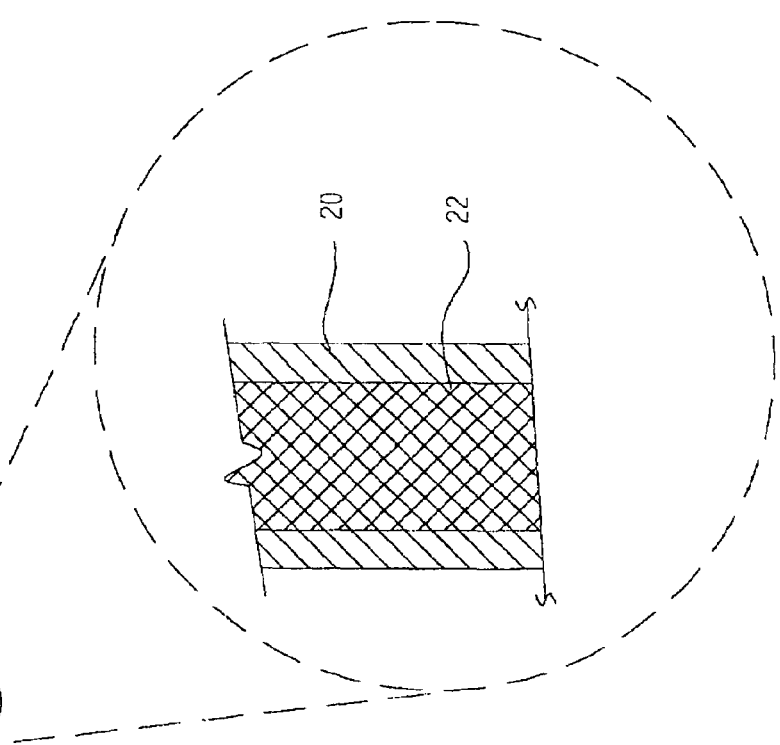
FIG. 3 is an enlarged portion of FIG. 2.
Figure 7:
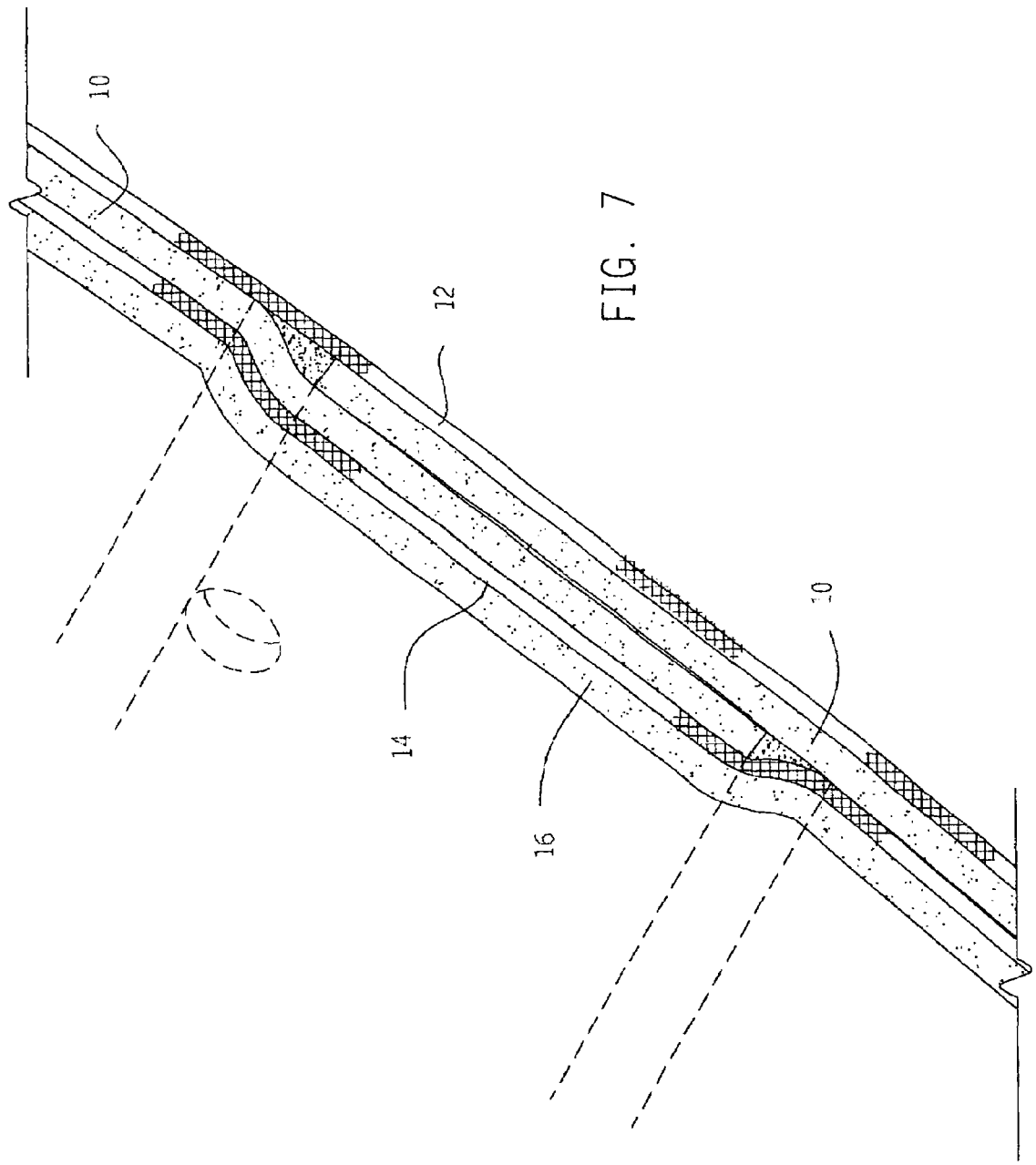
FIG. 7 is detailed plan of a portion of FIG. 6, showing the hull lamina.

When the ribs have been installed to within three inches (120 mm) of each Kevlar piece, the magnets are removed in the next two foot wide area on each side, and two additional two-foot long sections of precut Kevlar are installed next to the existing Kevlar. The butt joints 18 between the sections of Kevlar are covered with six-inch (150 mm) strips 20 of Kevlar and four-inch (100 mm) strips 22 of carbon fiber, as shown in FIGS. 2, 3 and 7. Additional full-width ribs are installed until reaching the keelsons 24.

Figure 6:
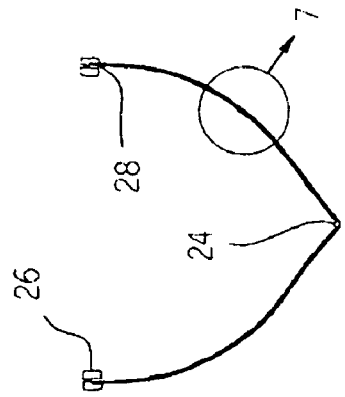
FIG. 6 is a sectional view of the canoe, taken on the plane 6-6 in FIG. 5.
Figure 4:
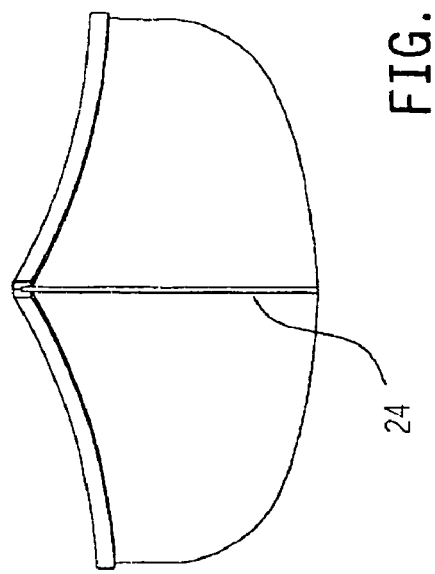
FIG. 4 is a side elevation, partially broken away to show underlying structure.
Figure 5:
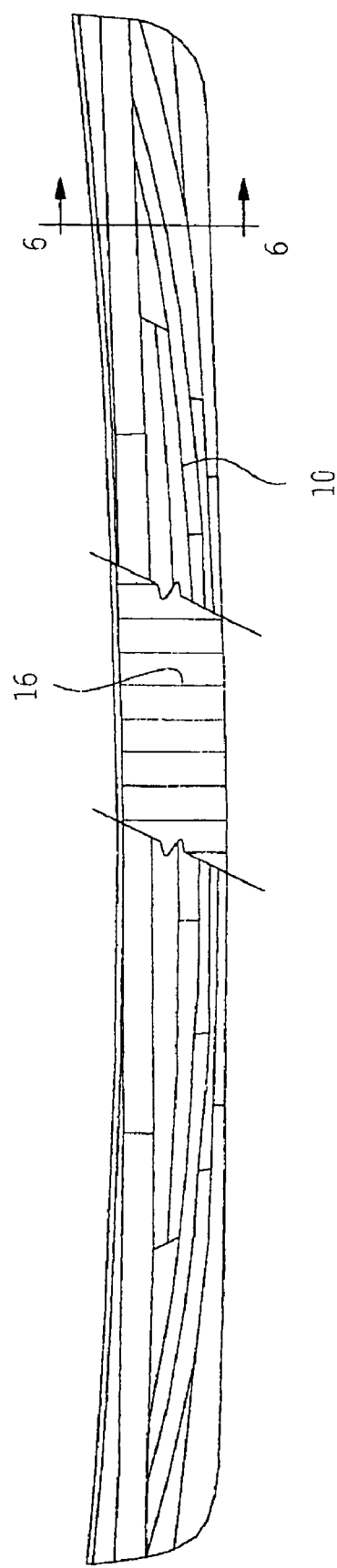
FIG. 5 is a front elevation showing the structural overlap grid created by the wood veneer overlap.

The keelsons 24 (see FIG. 6) are installed at the bow and stern. The keelsons function as reinforcements at the bow and stern and also act as stops or clamps for the half width ribs. The ribs 16 are installed alternately, port and starboard, to provide equal pressure on the keelsons.

After completion of the rib installation, infusion inwales 26 (FIG. 6) are placed in the mold. The first step of inwale installation is to put twenty-five pieces of full length Kevlar tow in each infusion channel. The inwales, which have internal flow passages 28, extend the full length of the hull and are held in place by the shear clamps and their own spring fit. Reusable polyethylene epoxy ports are then fit at the bow and the stern. The ports are designed to allow resin to flow from the vacuum bag connections to a d" (9 mm) diameter hole, which is located four inches (100 mm) from the end of the infusion inwales. A silicone film "bag" is placed over the laid-up hull, and vacuum bagging tape is then run around the top edge of the mold to form a hermetic chamber between the film and the mold. Finally, vacuum connections are made to connect the chamber with a vacuum pump.

Now, the vacuum pump is turned on and adjusted for full vacuum, so that air is evacuated from between the vacuum bag and the mold. Clamps normally closing the epoxy ports are opened and resin is drawn into the bag by the vacuum. The resin flows through the passages 28 within the inwales and then through the ⅟₃₂" (0.75 mm) gap at the bottom of the inwales (caused by the overlap of the wood veneer). The resin follows the triangular infusion channels along the sides of the ribs and is drawn through the perforations in the wood veneer. Once the resin as passed through the veneer, it is drawn down the infusion triangles which were created by the overlap of the wood veneer strakes. The resin continues to flow rapidly along the infusion channels and through the perforations until all of the materials are wet-out.

After infusion is complete, the boat is heated to accelerate the curing process and strengthen the epoxy.

Since the invention is subject to modifications and variations, it is intended that the foregoing description and the accompanying drawings shall be interpreted as only illustrative of the invention defined by the following claims.

The invention is appropriate for constructing aircraft or spacecraft fuselages.

The invention is not limited to the particular embodiments described herein, rather only to the following claims.

I claim:

1. A method of making a boat hull or an aircraft or spacecraft fuselage, said method comprising steps of
   laying strakes of wood veneer into a mold in such a way that the veneer strakes at least partially overlap one another, creating channels between the strakes and the mold through which fluids can flow,
   placing an air-impervious material over the strakes and the mold,
   sealing the edges of the film against the mold to form a vacuum chamber,
   connecting a source of liquid resin to at least one point in the chamber,
   connecting a source of vacuum to at least one other point in the chamber, to draw the resin into the chamber and along said channels so as to replace the air in the mold, and
   curing the resin to unify the strakes to form the hull or fuselage.

2. The method of claim 1, comprising a further step of arranging a plurality of transverse ribs over the strakes before the step of placing the air-impervious material.

3. The method of claim 1, comprising a further step of depositing a layer of fiberglass cloth in the mold before the step of laying the strakes.

4. The method of claim 1, comprising a further step of placing transverse strips of a reinforcing fabric over the strakes before the step of placing the air-impervious material.

5. The method of claim 1, further comprising a step of placing inwales having internal flow passages along edges of the hull, inside the strakes, before placing the air-impervious material, and then connecting the source of chambers to the internal flow passages in the inwales before connecting the source of vacuum.

* * * * *